Oct. 27, 1953      F. F. KURTH      2,657,249
STORAGE BATTERY
Filed April 16, 1951
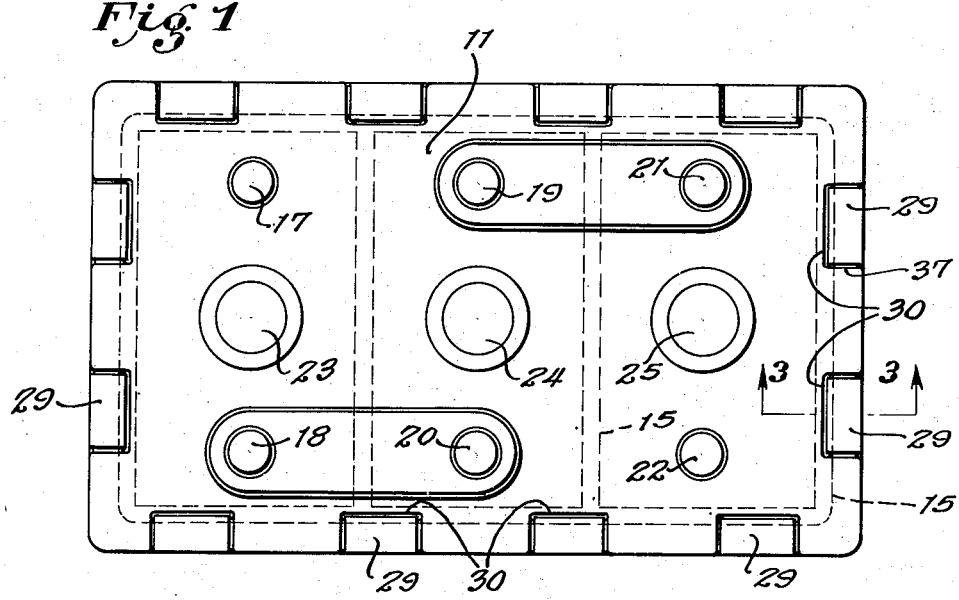
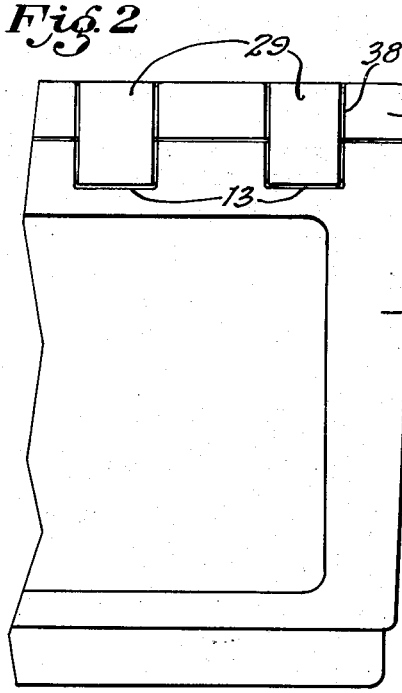
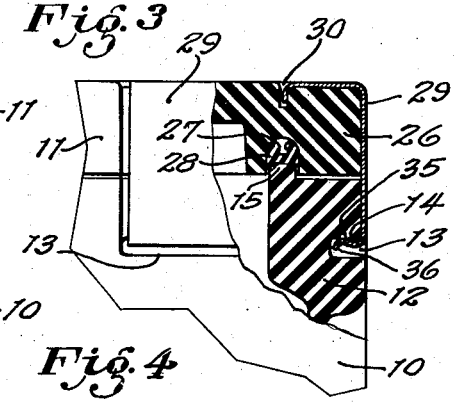
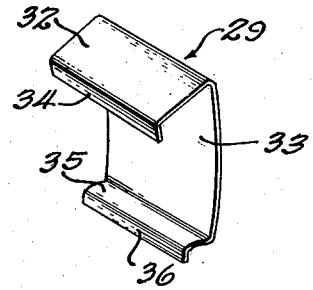
INVENTOR,
FRED F. KURTH
BY Calvin Brown
ATTORNEY Patented Oct. 27, 1953

2,657,249

UNITED STATES PATENT OFFICE 2,657,249

STORAGE BATTERY

Fred F. Kurth, Bakersfield, Calif.

Application April 16, 1951, Serial No. 221,205

2 Claims. (Cl. 136—166)

1

My invention relates to the construction of electric storage batteries of the wet type used for the ignition systems of most internal combustion engines. Such batteries consist of a number of cells, commonly three in number, placed in separate compartments of a single container closed by a permanent cover.

In present practice the containers are formed or molded from material, such as hard rubber, and the compartments are closed by individual covers of the same material molded with openings to receive the terminal posts of the cells positioned in each compartment, with openings for pouring the electrolyte into the compartments and adding make up water from time to time.

The individual covers are fitted against the body of the container, the assembly being united by sealing compound of asphalt or the like run in a molten condition into the joints between the covers and the body of the container and between the individual covers in order to provide a liquid tight assembly.

Since the sealing compound is relatively soft, it will be understood that the built up construction is likely to develop cracks around the compartment covers because the latter being of relatively small area and carrying the heavy load of battery plates attached to the terminal posts lack sufficient rigidity to adequately resist the violent vibration to which the battery plates are subjected in use and the stresses to which the terminal posts may be subjected in removing and attaching cables and carrying the batteries by slings secured to the terminal posts when the battery is removed from the vehicle for charging.

Vibration of the plates may also cause the terminal posts to work loose in the covers with the result that the acid electrolyte works up along the terminal posts and corrodes them, depositing lead sulphate which results in poor contact between the terminals of the battery and the cables, and eating away the latter.

The loosening of the terminal posts in the covers also results in the sagging and distortion of the plates connected thereto causing deterioration of the latter.

In the larger batteries used for many purposes, it is an advantage to be able to inspect the plates, separators and interior walls of the container to check their condition, and if the battery is provided with the usual form of built up and sealed in cover, the removal of the cover is a relatively laborious matter involving cutting through the sealing compound between the edge of the cover

2 and the container with a heated knife and after inspection, of course, necessitates resealing the cover in place.

To remedy the disadvantages pointed out, it is an object of my invention to provide a one-piece cover, which may be formed of the same material as the container, and to mount the cover so that it is rigidly connected when in use to the whole perimeter of the upper edge of the container.

It is a further object of the invention to provide a solid storage battery cover and means for firmly but detachably securing it in place on the battery container, thereby enabling the cover to be lifted off, after freeing said securing means, with the plates of each cell secured thereto, thereby facilitating inspection of the plates and interior of the container.

A further object of my invention is to provide a storage battery provided with a solid cover detachably connected by readily manipulatable means, to the battery container to afford fluid-tight assembly, the construction resulting in a very considerable saving of time in assembling the batteries.

Yet another object of my invention is to provide a storage battery having a solid top extending over the whole top of the battery container and to which the battery plates, connector bars, and associated parts are secured, the solid cover being directly clamped to the battery container, thus affording a solid support to the battery plates resulting in avoidance of damage to the seal between the battery terminals and the cover due to vibration to which the battery is subjected in use, and a more rigid cover resistant to cracking than has previously been known in the art.

Another object of my invention is to provide a storage battery having greater resistance to mechanical failure yet costing less to produce than batteries as hitherto manufactured.

Still further objects and features of my invention will hereinafter appear in the following description read with reference to the accompanying drawing which illustrates an embodiment of the invention at present considered preferable by me and in which:

Figure 1 is a plan view of a battery provided with a solid cover formed according to the invention;

Figure 2 is a fragmentary side elevation of the battery shown in Figure 1;

Figure 3 is a fragmentary sectional view taken on the line 3—3 of Figure 1, and showing part of the wall of the battery case and cover in front of the section line; and Figure 4 is a detail perspective view, drawn on a larger scale, of one of a plurality of clips used to detachably secure the cover to the container body of the battery.

In the drawings, the numeral 10 in Figure 2 indicates the battery container body and the one-piece cover is indicated at 11.

The container body and the battery cells may be formed by the usual methods and the method of construction of those parts of the battery form no part of my invention and, therefore, will not be described.

The upper edge or rim of the container body is, however, provided with a thickened portion 12, Figure 3, which is slotted or recessed along is outer face as indicated at 13. The upper face bounding the slot 13 is inclined upwardly from the rounded entrance 14 to the slot.

An upstanding ridge, flange, or bead 15 is formed to extend peripherally around the top surface of the thickened portion 12 of the container wall. When the container is of the compartment type, the tops of the walls of the compartments are provided with ridges, flanges or beads 15 in the plane of the top of the upstanding ridge 15.

The cover 16 is molded from a single piece of material, such as hard rubber, and is provided with the necessary holes to receive the terminal posts of the battery cells indicated at 17 through 22, and to provide the necessary filling and vent openings for each compartment which openings are closed by the usual caps shown at 23, 24 and 25. The battery plates are secured in the usual way to bars formed integrally with the terminal posts.

The cover is formed with a thickened peripheral rim 26 grooved on its lower face as shown at 27 to fit over the upstanding ridge 15 located on the thickened rim of the container. In the case of a multi-cell battery, the cover is provided with transverse thickened portions or ribs also grooved on their lower faces to fit over the ridges or beads on the tops of the transverse walls dividing the compartments.

It will be noted that the solid cover provides unitary member able to resist vibration of the relatively heavy battery plates, than is the usual built up battery cover, and thus preventing the cell terminals from working loose and, therefore, being much more effective in supporting the plates in accurate position in the cells.

A gasket member 28 is positioned between the tops of the upstanding peripheral ridges 15 and the gasket receiving grooves on the cover. As shown in Figure 3, the gasket is preferably of channel cross-section and is made from a resilient material, such as latex. The lower side of the gasket is flat and supported on the substantially flat top of the upstanding peripheral ridge 15, the sides of the channel gasket extending upwardly and tightly received within the grooves of the cover when the latter is secured in position on the container.

In order to secure the cover in place on the container, I prefer to use a plurality of clamps or clips 29, received in grooves 30 in the cover and in the grooves 13 of the thickened rim of the container. The form of the clamps is clearly shown in Figure 4. Each clamp comprises a strip of spring metal having one end 32 bent at an acute angle to the bowed back 33 and then bent at a right angle to form a flange 34 adapted to be received in slot 30. The opposite end of the strip is turned inwardly on a curve of small radius providing part 35, approximating the radius of the rounded off edge 14, bounding slot 13, and the free edge of the part 35 is reversedly bent outwardly to form a lip 36.

It will be obvious that the work of assembling a storage battery constructed according to my invention is much less than in assembling the usual form of battery since the plates with their bars and terminal posts may be quickly and accurately assembled on the cover, with the gasket members positioned either in the grooves in the cover or on the ridges of the container and the cover lowered into position with the plates secured thereto as a unit, without any loss of time due to fitting each compartment of the case with its individual cover and then sealing the covers in position with a hot compound; the cost of fabricating the storage batteries of my invention is thereby lessened.

To secure the solid cover of my invention in place, it is necessary only to hook the flanges 34 of the clamps 29 in the slots 30 and apply pressure to the bowed backs of the clamps which will force lips 36 to ride over the curved upper faces bounding slots 13 until the ends 35 fully engage against the curved upper faces. The resilient force exerted by the clamps will securely clamp the cover on the container. The cover may, however, be quickly freed for removal by inserting a tool into slot 13 for engagement with lip 36 to release the clamps.

When the clamps 29 have been removed, the cover with the battery plates of each cell can be vertically lifted out of the container fully exposing both the plate assemblies and the interior of the container for inspection.

While I have described and illustrated a preferred embodiment of the invention, it is to be understood that various modifications and changes therein may be made by those skilled in the art without departing from the scope of the invention as defined by the appended claims.

I claim:

1. A storage battery including: a container for liquid electrolyte; a cover for said container formed as a single unitary member; said cover and said container provided along the sides and ends thereof with spaced grooves, which grooves are in alignment when the cover is on the container, and detachable spring clips bridging the cover and container and positioned within said grooves so as to lie in flush surface engagement with the cover and container and for maintaining the cover and the container in juxtaposition.

2. A storage battery including a container for liquid electrolyte, the upper edge of the container being provided with a thickened peripheral portion, a cover for said container formed as a single unitary member, both the said cover and the said container provided along the sides and ends thereof with aligned shallow grooves, each shallow groove in the said cover terminating in a deep groove and the shallow groove in the thickened rim of the container terminating in a deep groove; and the spring clips bridging the cover and container and received within said shallow grooves, so as to lie in flush surface engagement with the cover and container the said spring clips being formed with end portions for reception within the deep grooves.

FRED F. KURTH.

References on following page.

References Cited in the file of this patent

UNITED STATES PATENTS

| Number | Name | Date |
|---|---|---|
| 410,054 | Waldron | Aug. 27, 1889 |
| 1,230,390 | Flanders | June 19, 1917 |
| 1,468,051 | Thompson, Jr. | Sept. 18, 1923 |
| 1,635,976 | Percy | July 12, 1927 |
| 2,025,482 | Taylor | Dec. 24, 1935 |
| 2,318,792 | Paddock | May 11, 1943 |
| 2,453,835 | Donkin | Nov. 16, 1948 |

FOREIGN PATENTS

| Number | Country | Date |
|---|---|---|
| 115,868 | Australia | Oct. 1, 1942 |
| 217,131 | Great Britain | June 12, 1924 |